United States Patent
Morishita

(10) Patent No.: US 9,317,287 B2
(45) Date of Patent: Apr. 19, 2016

(54) MULTIPROCESSOR SYSTEM

(75) Inventor: Hiroyuki Morishita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 325 days.

(21) Appl. No.: 14/232,389

(22) PCT Filed: Jun. 6, 2012

(86) PCT No.: PCT/JP2012/003704
§ 371 (c)(1),
(2), (4) Date: Jan. 13, 2014

(87) PCT Pub. No.: WO2013/011620
PCT Pub. Date: Jan. 24, 2013

(65) Prior Publication Data
US 2014/0136821 A1      May 15, 2014

(30) Foreign Application Priority Data
Jul. 19, 2011   (JP) .................................. 2011-158123

(51) Int. Cl.
*G06F 9/38* (2006.01)
*G06F 9/30* (2006.01)
(Continued)

(52) U.S. Cl.
CPC ........ *G06F 9/30145* (2013.01); *G06F 9/30185* (2013.01); *G06F 9/3836* (2013.01); *G06F 9/3877* (2013.01); *G06F 11/362* (2013.01)

(58) Field of Classification Search
None
See application file for complete search history.

(56) References Cited

U.S. PATENT DOCUMENTS

| 5,361,352 A | 11/1994 | Iwasawa et al. |
| 6,289,473 B1 | 9/2001 | Takase |
| 2013/0145084 A1* | 6/2013 | Hiromatsu .......... G06F 12/0246 711/103 |

FOREIGN PATENT DOCUMENTS

| CN | 101231584 | 7/2008 |
| EP | 1 883 051 | 1/2008 |

(Continued)

OTHER PUBLICATIONS

Office Action issued Jun. 2, 2015 in Chinese Application No. 201280035369.5, with partial English translation.

(Continued)

*Primary Examiner* — Scott Sun
(74) *Attorney, Agent, or Firm* — Wenderoth, Lind & Ponack, L.L.P.

(57) ABSTRACT

To provide a multi-processor system that efficiently debugs operations of one processor and operations of another processor. The multiprocessor system has a first processor and a second processor that executes processing by receiving notification from the first processor. The first processor: sequentially specifies instructions to be executed from an instruction queue; sends a notification based on a processing request instruction to the second processor when an instruction that is specified is the processing request instruction; executes the instruction that is specified when the instruction that is specified is not the processing request instruction; and determines whether or not a debug mode is set. When the first processor determines that the debug mode is set, the first processor stops specifying instructions after specifying the processing request instruction, and, after sending the notification, resumes specifying instructions after detecting that the second processor has completed processing corresponding to the notification.

7 Claims, 9 Drawing Sheets

(51) Int. Cl.
*G06F 11/36* (2006.01)
*G06F 9/00* (2006.01)

(56) References Cited

FOREIGN PATENT DOCUMENTS

| JP | 1-106234 | 4/1989 |
| JP | 3-218539 | 9/1991 |
| JP | 6-59908 | 3/1994 |
| JP | 7-319694 | 12/1995 |
| JP | 11-232135 | 8/1999 |
| JP | 2006-293759 | 10/2006 |
| JP | 2007-4364 | 1/2007 |
| WO | 2006/123546 | 11/2006 |

OTHER PUBLICATIONS

International Search Report issued Sep. 4, 2012 in International (PCT) Application No. PCT/JP2012/003704.

* cited by examiner

MULTIPROCESSOR SYSTEM

TECHNICAL FIELD

The present invention is related to technology improving software debugging efficiency in multiprocessor systems that include a main processor and a coprocessor.

BACKGROUND ART

The amount of computation required for media processing such as compression, decompression, and other media processing of digitized image data, audio data, etc., is very large. Thus, specialized hardware, high performance digital signal processors (DSP), etc., for performing such media processing, are in widespread use.

Regarding such media processing, a very large number of standards are in use: MPEG-2, MPEG-4 (MPEG is short for Moving Picture Experts Group), H.263, H.264, etc. Thus, digital audio-visual (AV) equipment is required to handle media processing using multiple standards. Further, the complexity of media processing applications is tending to increase, and image size, number of audio channels, etc., are all tending to increase, and therefore the amount of computation required is increasing.

Accordingly, increased media processing performance is achieved by using a high-performance processor provided with a coprocessor specialized in specific computations, which greatly increases computational efficiency.

In a multi-processor system that includes a coprocessor, when there is no software data dependency and no hardware resource conflict between processing at the main processor and processing at the coprocessor, performance is further increased by simultaneously executing the processing at the main processor and the processing at the coprocessor.

For example, Patent Literature 1 discloses setting execution modes of a main processor and a coprocessor (a floating-point number processing unit (FPU)) and causing instructions execution operations of the processors to change. According to Patent Literature 1, instruction execution modes (serial or scalar) of the main processor and the coprocessor (FPU) are matched, such that when floating-point instructions (assigned to the coprocessor) are to be executed, a control is performed of matching the instruction execution mode of the main processor with the instruction execution mode of the coprocessor (FPU). Thus, processing by the main processor and the coprocessor is performed at the same time.

CITATION LIST

Patent Literature

[Patent Literature 1]
Japanese Patent Application Publication No. H7-319694

SUMMARY OF INVENTION

Technical Problem

However, according to the technology described above, while operations are simplified and performance is increased by synchronizing the instruction execution mode of the main processor with the operation of the coprocessor, efficiency of software debugging of the main processor and coprocessor is decreased.

The present invention aims to provide a multi-processor system and method that efficiently debugs operations of one processor and operations of another processor.

Solution to Problem

To achieve the above aim, the present invention provides a multiprocessor system comprising a first processor and a second processor that executes processing by receiving a notification from the first processor, wherein the first processor includes: a determination unit configured to determine whether or not a debug mode is set; a specification unit configured to sequentially specify instructions to be executed from an instruction queue; an execution unit configured to, when an instruction that is specified is a processing request instruction that requests processing by the second processor, send a notification that is based on the processing request instruction to the second processor, and, when an instruction that is specified is not the processing request instruction, execute the instruction that is specified; and a detection unit configured to detect completion, by the second processor, of the processing corresponding to the notification, and when the determination unit determines that the debug mode is set, the specification unit stops specifying instructions upon specifying the processing request instruction, and resumes specifying instructions after the detection unit detects the completion of the processing corresponding to the notification.

Advantageous Effects of Invention

According to the above configuration, the multiprocessor system, when the determination unit determines that the debug mode is set, and upon specification of a processing request instruction, suspends specification of subsequent instructions. After detection that processing corresponding to the processing request instruction is completed, the multiprocessor system resumes specification of instructions. Thus, since specification of instructions is suspended after specifying the processing request instruction, instructions processed by the second processor and instructions after the specification of the processing request instruction are not issued in parallel, and therefore debugging is performed efficiently.

DESCRIPTION OF EMBODIMENT

[Knowledge Used as a Basis for the Present Invention]

The technology disclosed in Patent Literature 1, as mentioned above, simplifies operations and increases performance by synchronizing the instruction execution mode of the main processor to the operation of the coprocessor.

However, by using the technology disclosed in Patent Literature 1, efficiency of software debugging of the main processor and coprocessor is decreased. For example, in a case in which software running on the coprocessor erroneously destroys a portion of a memory region that is used by the main processor, simultaneously executing software debugging in parallel on the main processor and the coprocessor makes isolating the program that caused the malfunction difficult. In such a case, whether the malfunction is a malfunction resulting from an instruction queue executed by the main processor or from an instruction queue executed by the coprocessor is unclear. In other words, whether the malfunction is a software malfunction of software executed by the main processor or a software malfunction of software executed by the coprocessor is unclear.

The present inventor investigated extensively, arrived at a multiprocessor system able to efficiently debug operations of one processor and operations of another processor, and made the present invention.

One aspect of the present invention is a multiprocessor system comprising a first processor and a second processor that executes processing by receiving a notification from the first processor, wherein the first processor includes: a determination unit configured to determine whether or not a debug mode is set; a specification unit configured to sequentially specify instructions to be executed from an instruction queue; an execution unit configured to, when an instruction that is specified is a processing request instruction that requests processing by the second processor, send a notification that is based on the processing request instruction to the second processor, and, when an instruction that is specified is not the processing request instruction, execute the instruction that is specified; and a detection unit configured to detect completion, by the second processor, of the processing corresponding to the notification, and when the determination unit determines that the debug mode is set, the specification unit stops specifying instructions upon specifying the processing request instruction, and resumes specifying instructions after the detection unit detects the completion of the processing corresponding to the notification.

1. Embodiment 1

The following is an explanation of embodiment 1 of the present invention, given with reference to the drawings.

1.1 Configuration

Figure 1:
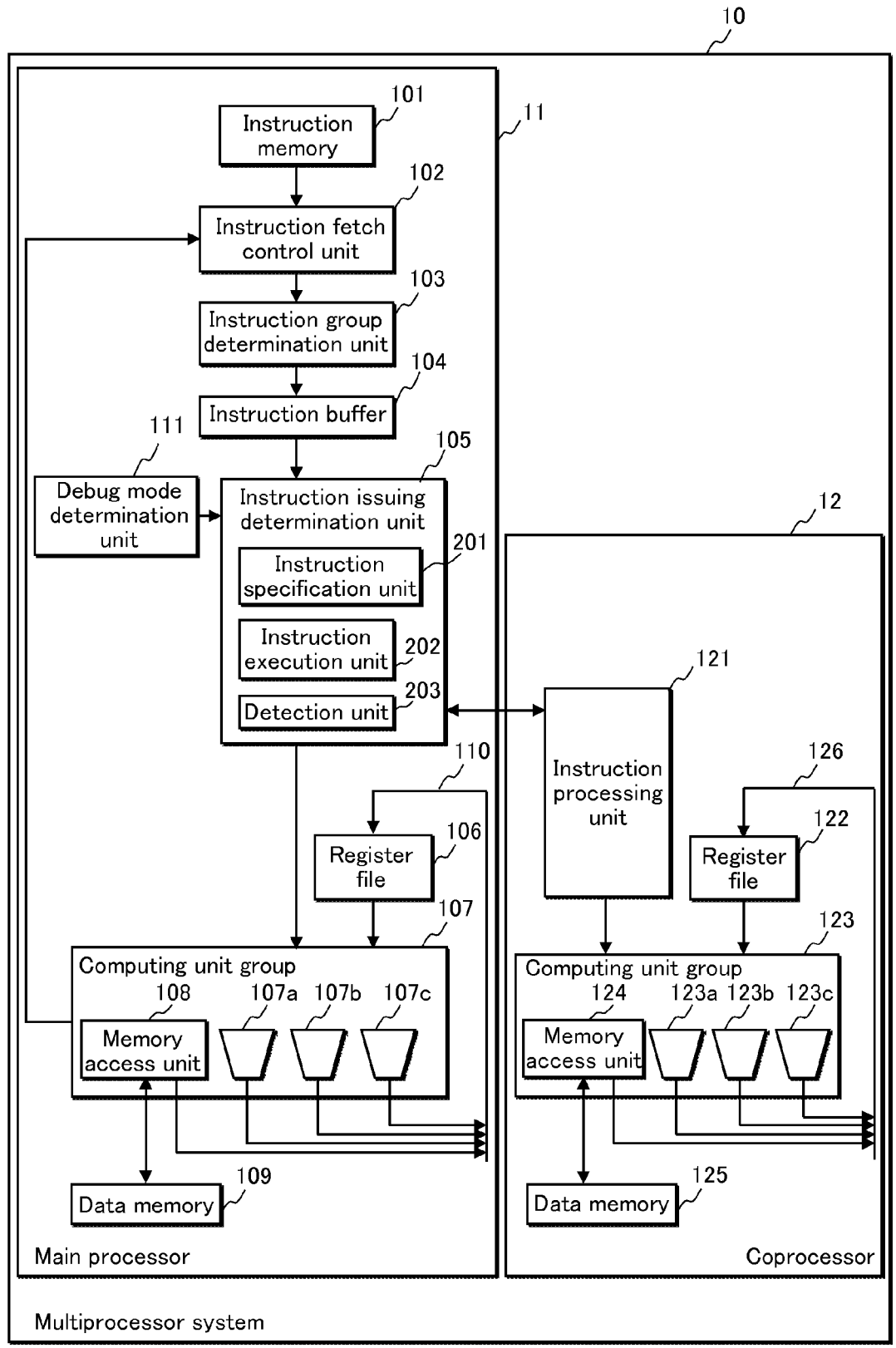
FIG. 1 is an illustration of the configuration of a multiprocessor system 10.

FIG. 1 is a block diagram of the configuration of a multiprocessor system 10 pertaining to embodiment 1.

As shown in FIG. 1, the multiprocessor system 10 includes a main processor 11 and a coprocessor 12. When the multiprocessor system 10 is not set to a debug mode, in other words when the multiprocessor system 10 is set to a normal mode, the main processor 11 and the coprocessor 12 perform processing in parallel. When the multiprocessor system 10 is set to the debug mode, the main processor 11 and the coprocessor 12 do not perform processing in parallel.

(1) Main Processor 11

As shown in FIG. 1, the main processor 11 includes an instruction memory 101, an instruction fetch control unit 102, an instruction group determination unit 103, an instruction buffer 104, an instruction issuing determination unit 105, a register file 106, a computing unit group 107, a data memory 109, a write-back bus 110, and a debug mode determination unit 111.

(1-1) Instruction Memory 101

The instruction memory 101 is a memory that stores instructions to be executed at the main processor 11. The instruction memory 101 stores an instruction stream composed of a plurality of instructions.

(1-2) Instruction Fetch Control Unit 102

The instruction fetch control unit 102 has a program counter (PC), and together with reading an instruction to be executed next from the instruction memory 101, updates a value of the program counter to a value corresponding to an instruction to be read next from the instruction memory 101.

Further, the instruction fetch control unit 102 receives, from the computing unit group 107, branch instruction execution and branch processing requests for special processing vectors that correspond to exceptional events, and controls the program counter accordingly.

(1-3) Instruction Group Determination Unit 103

The instruction group determination unit 103 reads instructions belonging to the instruction stream from the instruction memory 101, decodes the instructions, and writes the instructions to the instruction buffer 104.

(1-4) Instruction Buffer 104

The instruction buffer 104 receives and stores the instructions belonging to the instruction stream.

(1-5) Debug Mode Determination Unit 111

The debug mode determination unit 111 determines whether or not the debug mode is set.

Specifically, the debug mode determination unit 111 stores a debug mode designation register, determines whether or not the debug mode is set according to a value of the debug mode designation register, and notifies the instruction issuing determination unit 105 of whether or not the debug mode is set. Here, the debug mode designation register is a control register that is set by software.

(1-6) Instruction Issuing Determination Unit 105

During each machine cycle, the instruction issuing determination unit 105 determines an instruction to be issued from the instruction buffer 104. According to the instruction thus determined, the main processor 11 executes the instruction or performs a processing request to the coprocessor 12.

As shown in FIG. 1, the instruction issuing determination unit 105 has an instruction specification unit 201, an instruction execution unit 202, and a detection unit 203.

During each machine cycle, the instruction specification unit 201 specifies an instruction to be issued from the instruction buffer 104. When the debug mode determination unit 111 determines that the debug mode is set, and the coprocessor 12 is executing processing, the instruction specification unit 201 stops specifying instructions to be issued. When the processing by the coprocessor 12 is completed, the instruction specification unit 201 resumes specifying instructions to be issued.

When an instruction specified by the instruction specification unit 201 is an instruction requesting processing to the coprocessor 12 (hereafter, "processing request instruction"), the instruction execution unit 202 sends a notification (hereafter, "activation instruction") to the coprocessor 12, based on the processing request instruction. Also, when an instruction specified by the instruction specification unit 201 is not the processing request instruction, the instruction execution unit 202 executes the instruction. In other words, processing based on the instruction is performed at the computing unit group 107.

The detection unit 203 is for detecting completion of processing by the coprocessor 12 when the debug mode determination unit 111 determines that the debug mode is set. Specifically, the detection unit 203 judges that the coprocessor 12 is executing processing while receiving a signal (for example, a busy signal) output from the coprocessor 12. When no longer receiving the busy signal, the detection unit 203 judges that the processing by the coprocessor 12 is completed.

(1-7) Register File 106

The register file 106 is a register group that stores data that is read or written to when the instruction stream stored at the instruction buffer 104 is executed.

(1-8) Computing Unit Group 107

The computing unit group 107 is a processing unit that includes a plurality of computing units such as an adder, a multiplier, etc. Specifically, the computing unit group 107 includes a computing unit 107a, a computing unit 107b, and a computing unit 107c. As shown in FIG. 1, the computing unit group 107 also has a memory access unit 108.

Here, the memory access unit 108 is a computing unit for executing an instruction to access the data memory 109.

(1-9) Write-Back Bus 110

The write-back bus 110 is a bus for writing back output from the computing unit group 107 to the register file 106.

(1-10) Data Memory 109

The data memory 109 is accessed according to the instruction to access the data memory 109. The data memory 109 stores data used when a program is executed.

(2) Coprocessor 12

As shown in FIG. 1, the coprocessor 12 includes an instruction processing unit 121, a register file 122, a computing unit group 123, a data memory 125, and a write-back bus 126.

(2-1) Instruction Processing Unit 121

The instruction processing unit 121 activates and executes a coprocessor instruction stream by receiving the activation instruction from the instruction issuing determination unit 105.

The instruction processing unit 121 stores a plurality of coprocessor instruction streams that are independent from the instruction stream of the main processor 11. The activation instruction from the main processor 11 includes information designating which one of the plurality of coprocessor instruction streams is to be executed. For example, if three-bit designation information is included in the activation instruction, one of eight types of coprocessor instruction streams may be designated.

While a coprocessor instruction stream has been activated and is being executed, the instruction processing unit 121 outputs a busy signal to the instruction issuing determination unit 105 of the main processor 11. The instruction processing unit 121 stops outputting the busy signal when execution of the coprocessor instruction stream that has been activated is completed. Here, the coprocessor instruction stream includes an instruction indicating the end of the coprocessor instruction stream. When the instruction indicating the end of the coprocessor instruction stream is reached as a result of sequentially executing the coprocessor instruction stream, the instruction is treated as the completion of processing by the coprocessor 12.

(2-2) Register File 122

The register file 122 is a register group that stores data that is read or written to when the coprocessor instruction stream is executed.

(2-3) Computing Unit Group 123

The computing unit group 123 is a processing unit that includes a plurality of computing units such as an adder, a multiplier, etc., that are used according to the coprocessor instruction stream.

Further, as shown in FIG. 1, the computing unit group 123 also has a memory access unit 124. Here, the memory access unit 124 is a computing unit for executing an instruction to access the data memory 125.

(2-4) Write-Back Bus 126

The write-back bus 126 is a bus for writing back output from the computing unit group 123 to the register file 122.

(2-5) Data Memory 125

The data memory 125 is accessed according to the instruction to access the data memory 125. The data memory 125 stores data used when a program is executed.

1.2 Operation

Figure 2:
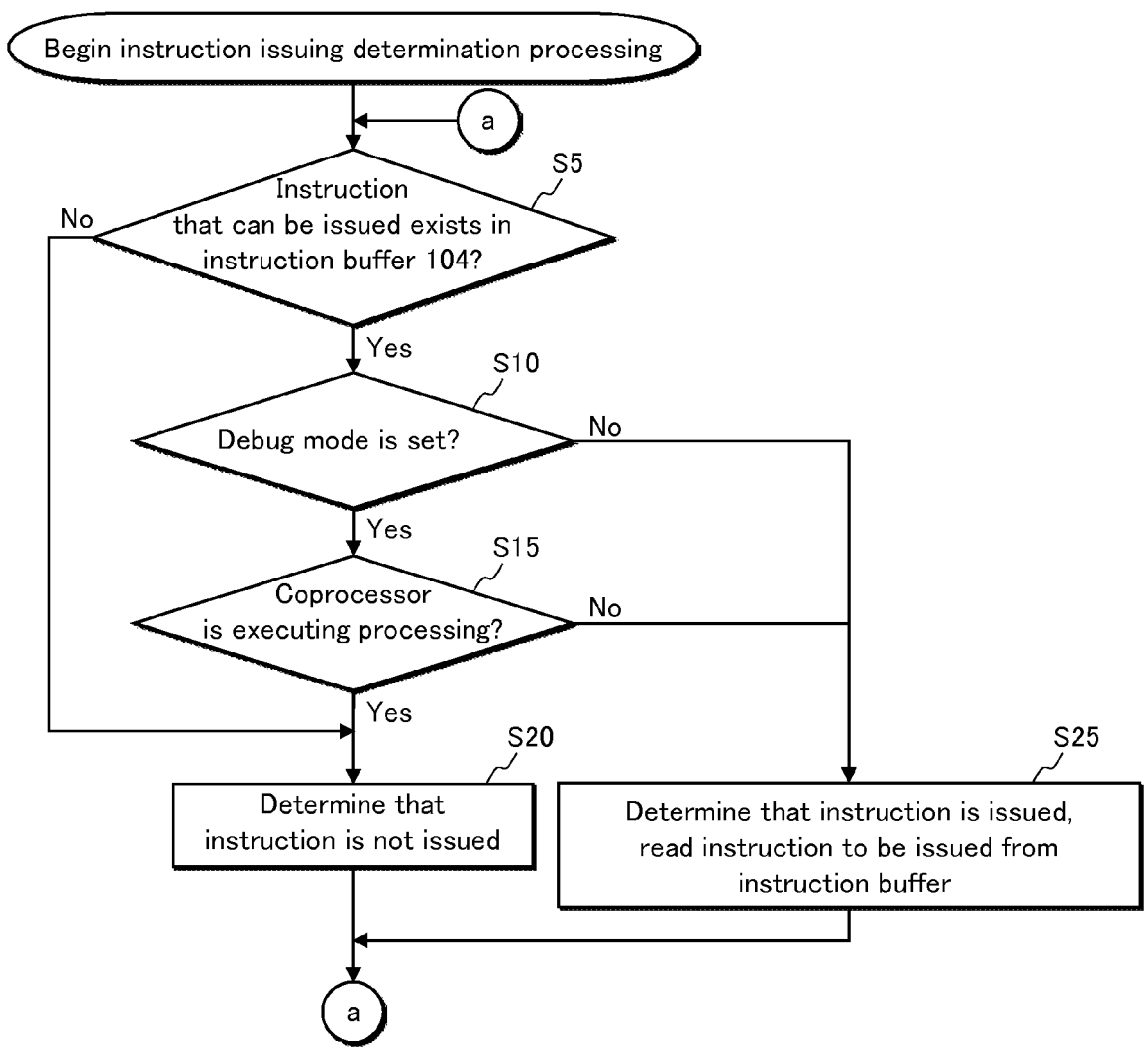
FIG. 2 is a flowchart of processing to determine instruction issuing.

Here, the flowchart shown in FIG. 2 is used in explaining processing by the instruction issuing determination unit 105 for determining whether an instruction is to be issued in a given cycle. Here, the processing for determining whether an instruction is to be issued in a given cycle is an operation of determining, from instructions accumulated in the instruction buffer 104, an instruction to be transferred to the computing unit group 107, and thereby executed.

The instruction specification unit 201 checks whether an instruction that can be issued exists in the instruction buffer 104 (step S5). Here, an instruction that can be issued is an instruction that has been assigned a valid signal in the instruction buffer 104. Cases in which an instruction that has been assigned a valid signal does not exist in the instruction buffer 104 are primarily cases in which the supply of instructions to the instruction buffer 104 is insufficient due to causes such as branching, memory access latency, etc. Further, cases in which an instruction that has been assigned a valid signal does not exist in the instruction buffer 104 may include cases in which an instruction has been supplied, but a valid signal has not been assigned due to data dependency from a previous instruction not being resolved.

When an instruction that has been assigned a valid signal exists in the instruction buffer 104 ("Yes" at step S5), the instruction specification unit 201 checks whether or not the debug mode is set (step S10). Checking whether or not the debug mode is set is performed based on the result of the determination by the debug mode determination unit 111.

When the instruction specification unit 201 judges that the debug mode is set ("Yes" at step S10), the detection unit 203 checks whether or not the coprocessor 12 is executing processing (step S15). Checking whether or not the coprocessor 12 is executing processing is performed based on whether or not the detection unit 203 is receiving the busy signal outputted from the instruction processing unit 121.

When the coprocessor 12 is executing processing ("Yes" at step S15), the instruction specification unit 201 determines that an instruction is not issued in the current cycle (step S20), and processing returns to step S5.

When an instruction that has been assigned a valid signal does not exist in the instruction buffer 104 ("No" at step S5), operation of the instruction specification unit 201 proceeds to step S20.

When judging that the debug mode is not set ("No" at step S10), or that the coprocessor 12 is not executing processing ("No" at step S15), the instruction specification unit 201 determines that an instruction is issued in the current cycle (step S25), and processing returns to step S5.

1.3 Specific Example

Here, explanation is provided of processing of the main processor 11 and processing of the coprocessor 12, in a case in which the normal mode is set and a case in which the debug mode is set.

Figure 3:
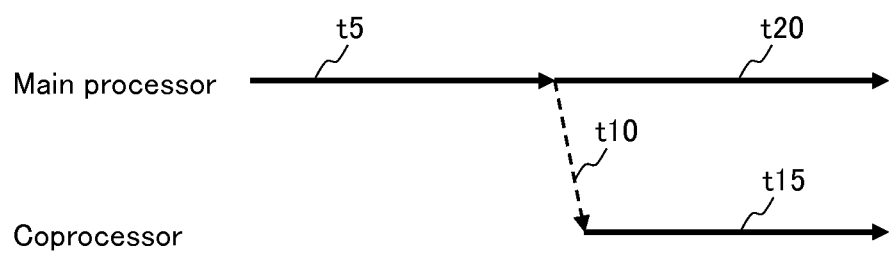
FIG. 3 is an illustration for explaining processing by a main processor 11 and a coprocessor 12 in a normal mode.

First, an explanation is given of a case in which the normal mode is set, using FIG. 3.

When the normal mode is set and the main processor 11 is executing instructions from an instruction stream (t5), a notification is sent to the coprocessor 12 based on a processing request instruction (t10). Upon receiving the notification, the coprocessor 12 activates and executes processing (t15). Further, when the normal mode is set, since there is no dependency between processing of the coprocessor 12 and processing of the main processor 11, the main processor 11 continues to execute subsequent processing (t20).

Figure 4:
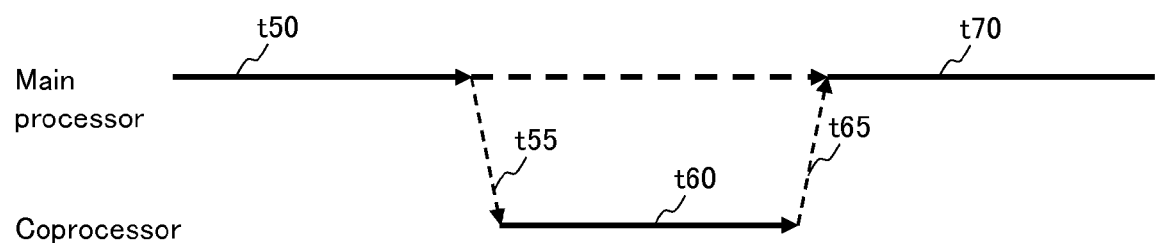
FIG. 4 is an illustration for explaining processing by the main processor 11 and the coprocessor 12 in a debug mode.

Next, an explanation is given of a case in which the debug mode is set, using FIG. 4.

When the debug mode is set and the main processor 11 is executing instructions from an instruction stream (t50), a notification is sent to the coprocessor 12 based on a processing request instruction (t55). Upon receiving the notification, an operation at the coprocessor 12 activates and processing is executed (t60). While the operation is being performed at the coprocessor 12 during t60, the coprocessor 12 outputs the busy signal to the main processor 11. While the main processor 11 is receiving the busy signal, the main processor 11 does not execute processing. When the operation at the coprocessor 12 is completed, the coprocessor 12 stops outputting the busy signal (t65). When the main processor 11 detects the completion of the operation at the coprocessor 12, the main processor 11 resumes processing (t70).

In this way, when the debug mode is set and processing of the coprocessor 12 is started, subsequent processing at the main processor 11 is not executed. Thus, non-operation of the main processor 11 is guaranteed during a period in which the coprocessor 12 is operating. Further, in one sequence of operations, an operation using parallelism between instructions at the main processor 11 and an operation using parallelism between instructions at the coprocessor 12 are executed in essentially the same way as the programmer of the sequence of operations (non-debug mode operations) ultimately intended.

1.4 Summary

According to the above, the multiprocessor system 10 pertaining to the present embodiment is able to perform switching, based on whether or not the debug mode is set, between performing execution of an instruction by the coprocessor 12 in parallel with execution of an instruction by the main processor 11, and performing execution of an instruction by the coprocessor 12 while preventing execution of an instruction by the main processor 11.

According to the present embodiment, isolating causes of malfunctions when debugging a high-performance processor with a coprocessor is performed easily, without modification by software.

2. Embodiment 2

The following is an explanation of embodiment 2 of the present invention, given with reference to the drawings.

2.1 Configuration

Figure 5:
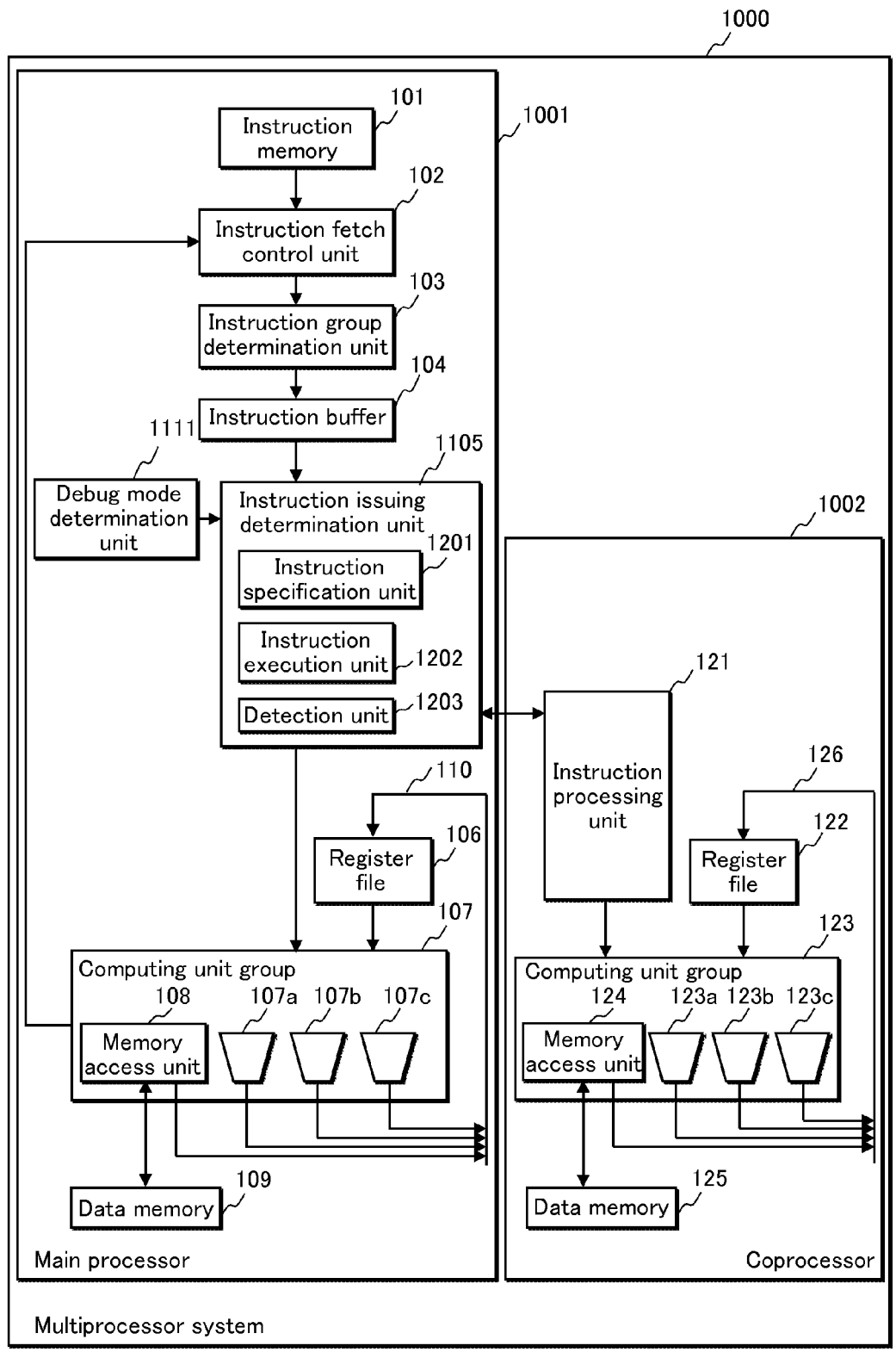
FIG. 5 is an illustration of the configuration of a multiprocessor system 1000.

FIG. 5 is a block diagram of the configuration of a multiprocessor system 1000 pertaining to embodiment 2.

The multiprocessor system 1000 has, in addition to functions in the debug mode (hereafter, "first debug mode") indicated in embodiment 1, functions in a second debug mode.

An explanation of the functions in the second debug mode follows. Functional elements that are the same as the functional elements in embodiment 1 have the same symbols as used in embodiment 1.

As shown in FIG. 5, the multiprocessor system 1000 includes a main processor 1001 and a coprocessor 1002. When the multiprocessor system 1000 is not set to a debug mode, in other words when the multiprocessor system 1000 is set to a normal mode, the main processor 1001 and the coprocessor 1002 perform processing in parallel, as in embodiment 1. When the multiprocessor system 1000 is set to the first debug mode, the main processor 1001 and the coprocessor 1002 do not perform processing in parallel. Further, when the multiprocessor system 1000 is set to the second debug mode, the main processor 1001 and the coprocessor 1002 perform processing in parallel, but the coprocessor 1002 does not perform in parallel execution of one instruction stream and execution of another instruction stream. In other words, the coprocessor 1002 does not perform in parallel processing based on one notification and processing based on another notification.

(1) Main Processor 1001

As shown in FIG. 5, the main processor 1001 includes the instruction memory 101, the instruction fetch control unit 102, the instruction group determination unit 103, the instruction buffer 104, an instruction issuing determination unit 1105, the register file 106, the computing unit group 107, the data memory 109, the write-back bus 110, and a debug mode determination unit 1111.

The following is an explanation of the function of the instruction issuing determination unit 1105 and the debug mode determination unit 1111.

(1-1) Debug Mode Determination Unit 1111

The debug mode determination unit 1111 determines whether or not a debug mode is set. Further when a debug mode is set, the debug mode determination unit 1111 determines whether the debug mode is the first debug mode or the second debug mode.

Specifically, the debug mode determination unit 1111 stores a debug mode designation register, determines whether the first debug mode is set, the second debug mode is set, or no debug mode is set, according to a value of the debug mode designation register, and notifies the instruction issuing determination unit 1105 of a result of that determination. Here, the debug mode designation register is a control register that is set by software.

(1-2) Instruction Issuing Determination Unit 1105

During each machine cycle, the instruction issuing determination unit 1105 determines an instruction from the instruction buffer 104 to be issued. According to the instruction thus determined, the main processor 1001 executes the instruction or performs a processing request to the coprocessor 1002.

As shown in FIG. 5, the instruction issuing determination unit 1105 has an instruction specification unit 1201, an instruction execution unit 1202, and a detection unit 1203.

During each machine cycle, the instruction specification unit 1201 specifies an instruction to be issued from the instruction buffer 104. When the debug mode determination unit 1111 determines that the first debug mode is set, operations are performed as described above in embodiment 1.

When (i) the debug mode determination unit 1111 determines that the second debug mode is set, (ii) an instruction to be issued is a processing request instruction to the coprocessor 1002, and (iii) the coprocessor 1002 is executing processing, the instruction specification unit 1201 stops specifying instructions to be issued. When processing by the coprocessor 1002 is completed, the instruction specification unit 1201 resumes specifying instructions to be issued.

When an instruction specified by the instruction specification unit 1201 is a processing request instruction to the coprocessor 1002, the instruction execution unit 1202 sends the activation instruction to the coprocessor 1002. Also, when an instruction specified by the instruction specification unit 1201 is not the processing request instruction to the coprocessor 1002, the instruction execution unit 1202 executes the instruction. In other words, processing based on the instruction is performed at the computing unit group 107.

The detection unit 1203 is for detecting completion of processing by the coprocessor 1002 when the debug mode determination unit 1111 determines that the first debug mode or the second debug mode is set. Specifically, the detection unit 1203 judges that the coprocessor 1002 is executing processing while receiving a signal (for example, a busy signal) output from the coprocessor 1002. When no longer receiving the busy signal, the detection unit 1203 judges that the processing by the coprocessor 1002 is completed.

2.2 Operation

Figure 6:
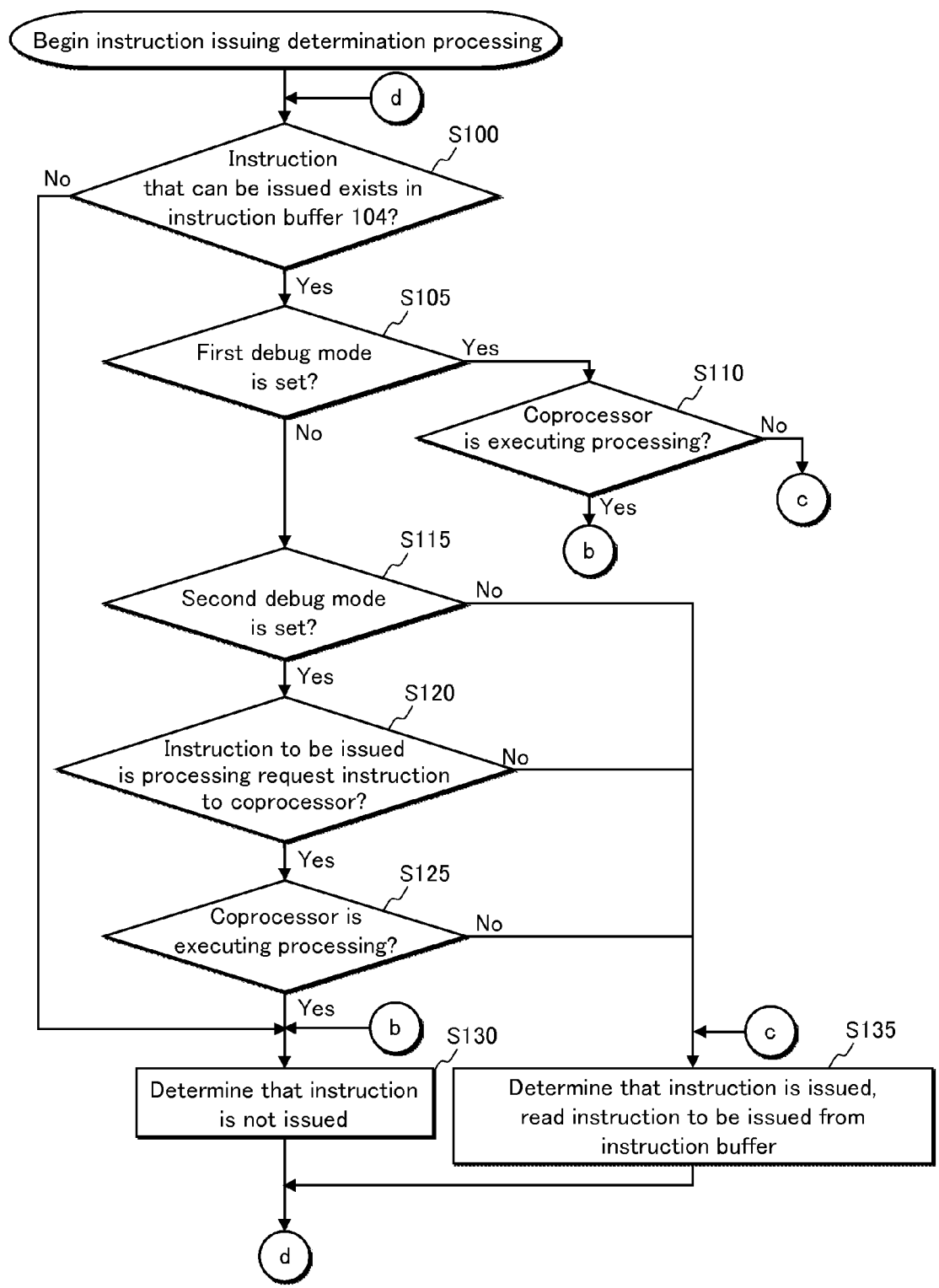
FIG. 6 is a flowchart of processing to determine instruction issuing.

Here, the flowchart shown in FIG. 6 is used in explaining processing by the instruction issuing determination unit 1105 for determining whether an instruction is to be issued in a given cycle. Here, the processing for determining whether an instruction is to be issued in a given cycle is an operation of determining, from instructions accumulated in the instruction buffer 104, an instruction to be transferred to the computing unit group 107, and thereby executed.

The instruction specification unit 1201 checks whether an instruction that can be issued exists in the instruction buffer 104 (step S100). Here, an instruction that can be issued is an instruction that has been assigned a valid signal in the instruction buffer 104. Cases in which an instruction that has been assigned a valid signal does not exist in the instruction buffer 104 are primarily cases in which the supply of instructions to the instruction buffer 104 is insufficient due to causes such as branching, memory access latency, etc. Further, cases in which an instruction that has been assigned a valid signal does not exist in the instruction buffer 104 may include cases in which an instruction has been supplied, but a valid signal has not been assigned due to data dependency from a previous instruction not being resolved.

When an instruction that has been assigned a valid signal exists in the instruction buffer 104 ("Yes" at step S100), the instruction specification unit 1201 checks whether or not the first debug mode is set (step S105). Checking whether or not the first debug mode is set is performed based on the result of the determination by the debug mode determination unit 1111.

When the instruction specification unit 1201 judges that the first debug mode is set ("Yes" at step S105), the detection unit 1203 checks whether or not the coprocessor 1002 is executing processing (step S110). Checking whether or not the coprocessor 1002 is executing processing is performed based on whether or not the detection unit 1203 is receiving the busy signal outputted from the instruction processing unit 121.

When the coprocessor 1002 is executing processing ("Yes" at step S110), the instruction specification unit 1201 determines that an instruction is not issued in the current cycle (step S130), and processing returns to step S100.

When judging that the coprocessor 1002 is not executing processing ("No" at step S110), the instruction specification unit 1201 determines that an instruction is issued in the current cycle (step S135), and processing returns to step S100.

When an instruction that has been assigned a valid signal does not exist in the instruction buffer 104 ("No" at step S100), operation of the instruction specification unit 1201 proceeds to step S135.

When the instruction specification unit 1201 judges that the first debug mode is not set ("No" at step S105), the instruction specification unit 1201 checks whether or not the second debug mode is set (step S120). Checking whether or not the second debug mode is set is performed based on a determination result by the debug mode determination unit 1111.

When the instruction specification unit 1201 judges that the second debug mode is set ("Yes", at step S115), the instruction specification unit 1201 checks whether or not the instruction to be issued is a processing request instruction to the coprocessor 1002 (step S120).

When the instruction specification unit 1201 judges that the instruction to be issued is a processing request instruction to the coprocessor 1002 ("Yes", at step S120), the detection unit 1203 checks whether or not the coprocessor 1002 is executing processing (step S125). Checking whether or not the coprocessor 1002 is executing processing is performed based on whether or not the detection unit 1203 is receiving the busy signal outputted from the instruction processing unit 121.

When the coprocessor 1002 is executing processing ("Yes", at step S125), the instruction specification unit 1201 determines that an instruction is not issued in the current cycle (step S130), and processing returns to step S100.

When judging that the coprocessor 1002 is not executing processing ("No", at step S125), the instruction specification unit 1201 determines that an instruction is issued in the current cycle (step S135), and processing returns to step S100.

2.3 Specific Example

Figure 7:
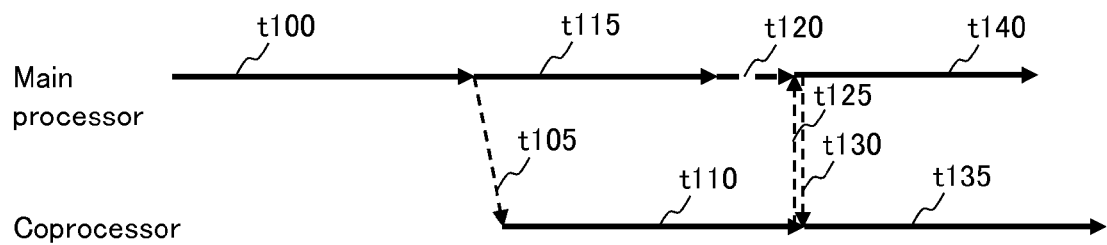
FIG. 7 is an illustration for explaining processing by a main processor 1001 and a coprocessor 1002 in a second debug mode.

Here, explanation is provided, using FIG. 7, of processing of the main processor 1001 and processing of the coprocessor 1002, in a case in which the second debug mode is set. Since a case in which the normal mode is set and a case in which the first debug mode is set are the same as the cases in embodiment 1, shown in FIG. 3 and FIG. 4, respectively, explanation thereof is omitted.

When the second debug mode is set and the main processor 1001 is executing instructions from an instruction stream (t100), a notification is sent to the coprocessor 1002 based on a processing request instruction (t105). In this example, since the coprocessor 1002 is not executing processing, a notification is sent.

When the coprocessor 1002 receives the notification, an operation at the coprocessor 1002 activates and processing is executed (t110). While the operation is being performed at the coprocessor 1002 during t110, the coprocessor 1002 outputs the busy signal to the main processor 1001.

Even while the coprocessor 1002 is executing processing (t110), the main processor 1001 continues processing as long as the instruction to be issued is not a subsequent processing request instruction (t115). When the instruction to be issued is the subsequent processing request instruction and the main processor 1001 is receiving the busy signal, the main processor 1001 does not execute processing (t120). Afterward, when the operation at the coprocessor 1002 is completed, the coprocessor 1002 stops outputting the busy signal (t125). When completion of the operation by the coprocessor 1002 is detected, the main processor 1001 resumes processing. In other words, the main processor 1001 issues the subsequent processing request instruction (t130).

Afterward, when the coprocessor 1002 receives a notification based on the subsequent processing request instruction, an operation at the coprocessor 1002 activates and processing is executed (t135). Even while the coprocessor 1002 is executing (t135), the main processor 1001 continues processing as long as the next instruction to be issued is not another processing request instruction (t140).

3. Embodiment 3

The following is an explanation of embodiment 3 of the present invention, which is an example of implementation of the multiprocessor system indicated in embodiment 1.

Figure 8:
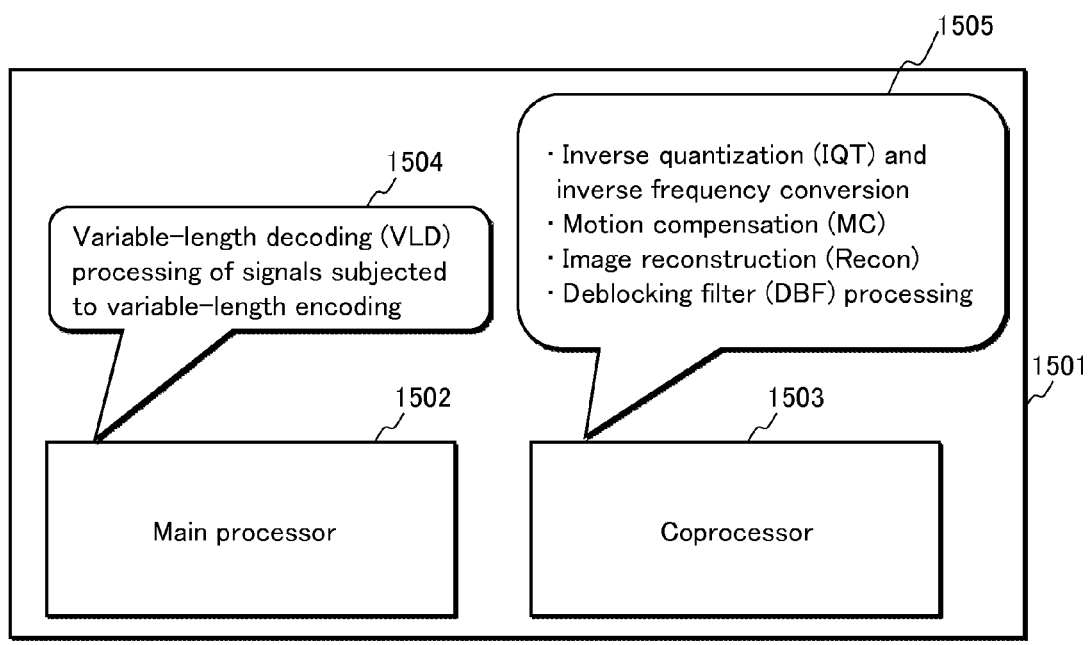
FIG. 8 is an illustration for explaining decoding by the multiprocessor system 10.

A multiprocessor system 1501, shown in FIG. 8, is a system LSI that performs decoding of images, intended for use in digital AV equipment.

For example, to decode an image signal compressed using a standard such as H.264, processing is required such as bitstream analysis, variable-length decoding (VLD) of signals subjected to variable-length encoding, inverse quantization (IQT) and inverse frequency conversion, motion compensation (MC), image reconstruction (Recon), and deblocking filter (DBF) processing.

From the above list, the inverse quantization (IQT), the inverse frequency conversion, the motion compensation (MC), the image reconstruction (Recon), and the deblocking filter (DBF) processing (refer to a processing group 1505 in FIG. 8) may be executed by using data parallelism. Therefore, such processing is well-suited to processing by a coprocessor 1503, which uses a specialized computing unit. By executing such processing at the coprocessor 1503, high-performance decoding is achieved.

Further, for example, by performing pipeline processing on each macroblock unit and executing in parallel a process 1504 (variable-length decoding (VLD) processing) at a main processor 1502, and the processing group 1505 at the coprocessor 1503, performance is further increased.

By using the functions in the debug mode described in embodiment 1, efficient debugging of the multiprocessor system 1501 is achieved.

Figure 9:
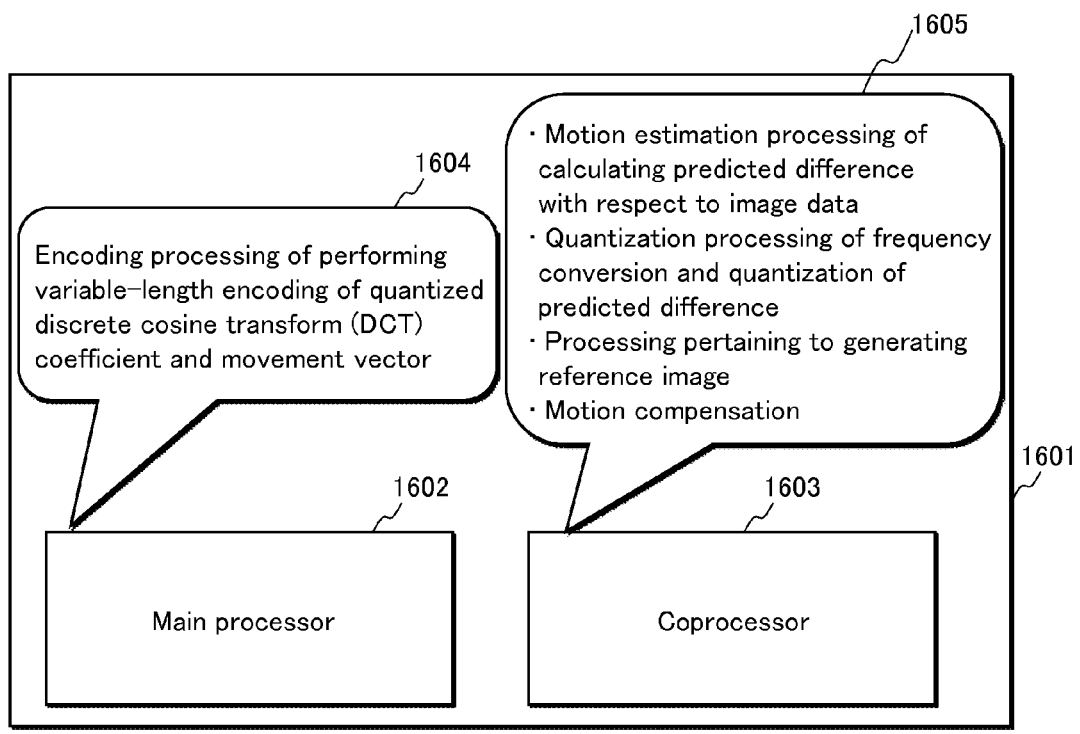
FIG. 9 is an illustration for explaining encoding by the multiprocessor system 10.

A multiprocessor system 1601, shown in FIG. 9, is a system LSI that performs encoding of images, intended for use in digital AV equipment.

When encoding a macroblock, the following processing is usually included: motion estimation processing for calculating a predicted difference with respect to image data to be encoded, quantization processing for frequency conversion and quantization of the predicted difference, encoding processing for variable-length encoding of a quantized discrete cosine transform (DCT) coefficient and a movement vector, processing pertaining to generation of a reference image, and processing pertaining to motion prediction.

From the above list, the motion estimation processing for calculating the predicted difference with respect to the image data to be encoded, the quantization processing for frequency conversion and quantization of the predicted difference, the processing pertaining to generating the reference image, and the motion compensation (refer to a processing group 1605) are processes that may be executed by using data parallelism. Therefore such processing is well-suited to processing by a coprocessor 1603, which uses a specialized computing unit. By executing such processing at the coprocessor 1603, high-performance encoding is achieved.

Further, for example, by performing pipeline processing on each macroblock unit and executing in parallel a process 1604 (variable-length encoding of a quantized DCT coefficient and a movement vector) at the main processor 1602, and the processing group 1605 at the coprocessor 1603, performance is further increased.

By using the function in the debug mode described in embodiment 1, efficient debugging of the multiprocessor system 1601 is achieved.

4. Modifications

Explanation is given above based on embodiments of the present invention, but the present invention is not limited to the embodiments described above. For example, the following modifications are possible.

(1) In the embodiments, the main processor judges whether or not the coprocessor is executing processing using the busy signal outputted from the coprocessor while the coprocessor is executing processing, but the present invention is not limited in this way.

When the coprocessor completes execution of an activated coprocessor instruction stream, the coprocessor may send a notification to the instruction issuing determination unit 105 indicating that the processing by the coprocessor is completed, and the main processor may detect that the processing by the coprocessor is completed by receiving the notification.

Further, completion of memory access by the coprocessor may be considered the completion of processing by the coprocessor. For example, when memory access is indicated in an instruction stream of the coprocessor and the memory access of data memory occurs, reading or writing to the data memory may be delayed with respect to the execution of instructions in the processor. In such a case, by considering the completion of memory access as the completion of processing by the coprocessor, for example, a malfunction caused by an address match due to unintended memory access may be detected.

(2) In embodiment 1, even when non-debug mode operations are being executed, restriction may be imposed such that an instruction activating the coprocessor and subsequent instructions to be executed by the main processor are not being issued at the same time. In this way, in the debug mode, an operation using parallelism between instructions at the main processor and an operation using parallelism between instructions at the coprocessor may be executed in exactly the same way as the programmer of the sequence of operations (non-debug mode operations) ultimately intended.

(3) In embodiment 2, the multiprocessor system 1000 may allow out-of-order execution.

In such a case, since instructions may be executed in a different order to the order indicated by the program counter, even an instruction subsequent to a processing request instruction, which requires a notification to be executed, may be executed before the processing request instruction, as long as the instruction is not dependent on the processing request instruction.

(4) A program that describes a process of the techniques explained in the above embodiments may be stored in memory. Further, a central processing unit (CPU), etc., may read the program from the memory and execute the program, whereby the techniques described above may be realized.

Further, a program that describes such a process of the techniques may be stored on recording media and thereby distributed.

(5) Each element of the multiprocessor system pertaining to the above embodiments may be implemented by a hardware resource (in cooperation with a processor and a program stored in memory).

(6) The above embodiments and modifications may be combined with one another.

5. Supplement (1) One aspect of the present invention is a multiprocessor system comprising a first processor and a second processor that executes processing by receiving a notification from the first processor, wherein the first processor includes: a determination unit configured to determine whether or not a debug mode is set; a specification unit configured to sequentially specify instructions to be executed from an instruction queue; an execution unit configured to, when an instruction that is specified is a processing request instruction that requests processing by the second processor, send a notification that is based on the processing request instruction to the second processor, and, when an instruction that is specified is not the processing request instruction, execute the instruction that is specified; and a detection unit configured to detect completion, by the second processor, of the processing corresponding to the notification, and when the determination unit determines that the debug mode is set, the specification unit stops specifying instructions upon specifying the processing request instruction, and resumes specifying instructions after the detection unit detects the completion of the processing corresponding to the notification.

According to this configuration, when the determination unit determines that the debug mode is set, the multiprocessor system stops specification of instructions after specifying the processing request instruction, and resumes specifying instructions after the completion of the requested processing. In this way, by stopping specification of instructions after specifying the processing request instruction, the multiprocessor system does not issue in parallel an instruction to be processed by the second processor and an instruction subsequent to the specified processing request instruction. Thus, efficient debugging is performed.

(2) In the multiprocessor system pertaining to one aspect of the present invention, when the second processor is executing the processing corresponding to the notification, the second processor may output a signal to the first processor indicating that the second processor is executing the processing corresponding to the notification, and the detection unit, when the second processor is outputting the signal, may judge that the second processor is executing the processing corresponding to the notification, and when the second processor is no longer outputting the signal, may judge that the second processor has completed executing the processing corresponding to the notification.

According to this configuration, the first processor of the multiprocessor system detects the completion of the processing by the second processor by the existence or non-existence of the signal outputted from the second processor.

(3) In the multiprocessor system pertaining to one aspect of the present invention, the completion of the processing corresponding to the notification may be when the second processor has completed memory access in response to each memory access instruction included in an instruction stream for executing the processing corresponding to the notification.

According to this configuration, the multiprocessor system considers the completion of memory access as the completion of processing by the second processor. Thus, for example, a malfunction caused by an address match due to unintended memory access may be detected.

(4) In the multiprocessor system pertaining to one aspect of the present invention, the determination unit may also determine whether or not a different debug mode other than the debug mode is set instead of the debug mode, and when the determination unit determines that the different debug mode is set, from when the specification unit specifies the processing request instruction and until when the detection unit detects the completion of the processing corresponding to the notification, the execution unit may: execute instructions existing up until a subsequent processing request instruction appears; or execute instructions existing up until the subsequent processing request instruction appears, and then execute instructions that are positioned after the subsequent processing request instruction and not dependent on the subsequent processing request instruction, and when the detection unit detects the completion of the processing corresponding to the notification that is based on the processing request instruction, the execution unit may send a notification that is based on the subsequent processing request instruction to the second processor.

According to this configuration, when the different debug mode is set, the multiprocessor system does not perform, in parallel, processing at the second processor corresponding to notifications based on different processing request instructions. In this way, before implementing parallel execution of the processing at the second processor corresponding to the notifications based on the different processing request instructions, debugging of parallel processing of the first processor and the second processor is performed, efficiently eliminating malfunctions.

(5) In the multiprocessor system pertaining to one aspect of the present invention, the first processor may further include a control unit that performs a control such that, when the determination unit determines that the debug mode is not set, specification of instructions is stopped after the specification unit specifies the processing request instruction, and resumed upon detection of completion of the processing of the second processor.

According to this configuration, even when the debug mode is not set, the multiprocessor system stops specification of instructions after the processing request instruction is specified, and resumes specification of instructions upon detection of completion of the processing of the second processor. In this way, an operation using parallelism of each instruction at the first processor and an operation using parallelism of each instruction at the second processor may be executed in exactly the same way in a non-debug mode as in the debug mode.

(6) In the multiprocessor system pertaining to one aspect of the present invention, instructions executed by the first processor and instructions executed by the second processor may be instructions for decoding images, and the multiprocessor system may be included in an image processing device that decodes images.

According to this configuration, the multiprocessor system may efficiently perform debugging of decoding processing.

(7) In the multiprocessor system pertaining to one aspect of the present invention, instructions executed by the first processor and instructions executed by the second processor may be instructions for encoding images, and the multiprocessor system may be included in an image processing device that encodes images.

According to this configuration, the multiprocessor system may efficiently perform debugging of encoding processing.

INDUSTRIAL APPLICABILITY

The multiprocessor system pertaining to the present invention implements flexible and efficient computing, and is therefore applicable to system LSI, etc., that performs media processing of images and audio for DVD recorders, digital TVs, etc.

REFERENCE SIGNS LIST

10, 1000 multiprocessor system
11, 1001 main processor 12, 1002 coprocessor
101 instruction memory
102 instruction fetch control unit
103 instruction group determination unit
104 instruction buffer
105, 1105 instruction issuing determination unit
106 register file
107 computing unit group
108 memory access unit
109 data memory
110 write-back bus
111, 1111 debug mode determination unit
121 instruction processing unit
122 register file
123 computing unit group
124 memory access unit
125 data memory
126 write-back bus
201, 1201 instruction specification unit
202, 1202 instruction execution unit
203, 1203 detection unit

The invention claimed is:

1. A multiprocessor system comprising a first processor and a second processor that executes processing by receiving a notification from the first processor, wherein
the first processor includes:
 a determination unit configured to determine whether or not a debug mode is set;
 a specification unit configured to sequentially specify instructions to be executed from an instruction queue;
 an execution unit configured to, when an instruction that is specified is a processing request instruction that requests processing by the second processor, send a notification that is based on the processing request instruction to the second processor, and, when an instruction that is specified is not the processing request instruction, execute the instruction that is specified; and
 a detection unit configured to detect completion, by the second processor, of the processing corresponding to the notification, and
when the determination unit determines that the debug mode is set, the specification unit stops specifying instructions upon specifying the processing request instruction, and resumes specifying instructions after the detection unit detects the completion of the processing corresponding to the notification.

2. The multiprocessor system of claim 1, wherein
when the second processor is executing the processing corresponding to the notification, the second processor outputs a signal to the first processor indicating that the second processor is executing the processing corresponding to the notification, and
the detection unit, when the second processor is outputting the signal, judges that the second processor is executing the processing corresponding to the notification, and when the second processor is no longer outputting the signal, judges that the second processor has completed executing the processing corresponding to the notification.

3. The multiprocessor system of claim 2, wherein
completion of the processing corresponding to the notification is when the second processor has completed memory access in response to each memory access instruction included in an instruction stream for executing the processing corresponding to the notification.

4. The multiprocessor system of claim 1, wherein
the determination unit also determines whether or not a different debug mode is set instead of the debug mode,
when the determination unit determines that the different debug mode is set, from when the specification unit specifies the processing request instruction and until when the detection unit detects the completion of the processing corresponding to the notification, the execution unit:
 executes instructions that are specified and not dependent on the processing request instruction, until a subsequent processing request instruction is specified; or
 executes instructions that are specified and not dependent on the processing request instruction, until the subsequent processing request instruction is specified, and then executes instructions that are specified after the subsequent processing request instruction and not dependent on the subsequent processing request instruction, and
when the detection unit detects the completion of the processing corresponding to the notification that is based on the processing request instruction, the execution unit sends a notification that is based on the subsequent processing request instruction to the second processor.

5. The multiprocessor system of claim 1, wherein
instructions executed by the first processor and instructions executed by the second processor are instructions for decoding images, and
the multiprocessor system is included in an image processing device that decodes images.

6. The multiprocessor system of claim 1, wherein
instructions executed by the first processor and instructions executed by the second processor are instructions for encoding images, and
the multiprocessor system is included in an image processing device that encodes images.

7. A method used by a multiprocessor system including a first processor and a second processor that executes processing by receiving a notification from the first processor, the first processor including a determination unit, a specification unit, an execution unit, and a detection unit, the method comprising:
the determination unit determining whether or not a debug mode is set;
the specification unit sequentially specifying instructions to be executed from an instruction queue;
the execution unit, when an instruction that is specified by the specification unit is a processing request instruction that requests processing by the second processor, sending a notification based on the processing request instruction to the second processor, and, when an instruction that is specified is an instruction that does not request processing by the second processor, executing the instruction that is specified; and
the detection unit detecting completion, by the second processor, of the processing corresponding to the notification, wherein
when the determination unit determines that the debug mode is set, the specification unit stops sequentially specifying instructions upon specifying the processing request instruction, and resumes sequentially specifying instructions after the detection unit detects the completion of the processing corresponding to the notification.

* * * * *